May 18, 1954　　　F. W. COFFING　　　2,678,840
SHAFT COUPLING
Filed Feb. 20, 1952　　　　　　　　　　2 Sheets-Sheet 1
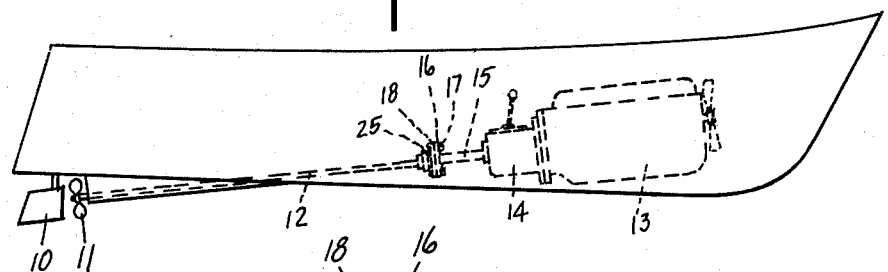
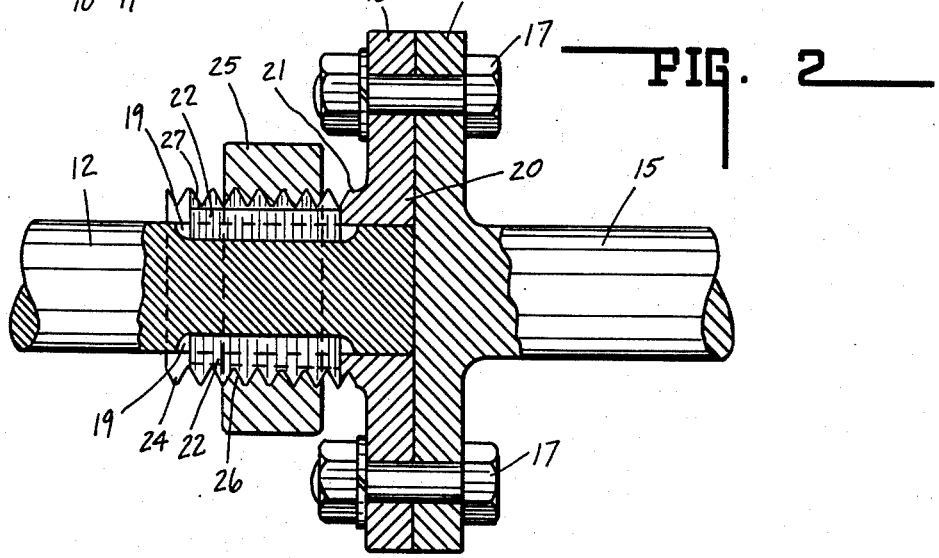
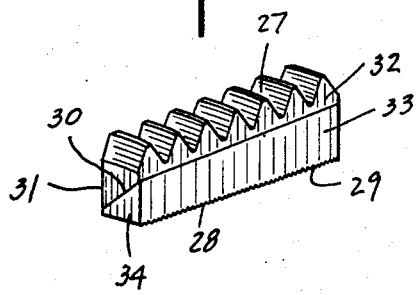
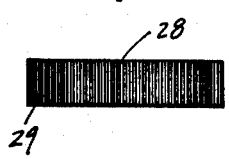
INVENTOR.
FREDRICK W. COFFING.
BY
Lockwood, Hahn, Galt & Woodard,
ATTORNEYS.

May 18, 1954  F. W. COFFING  2,678,840
SHAFT COUPLING
Filed Feb. 20, 1952  2 Sheets-Sheet 2
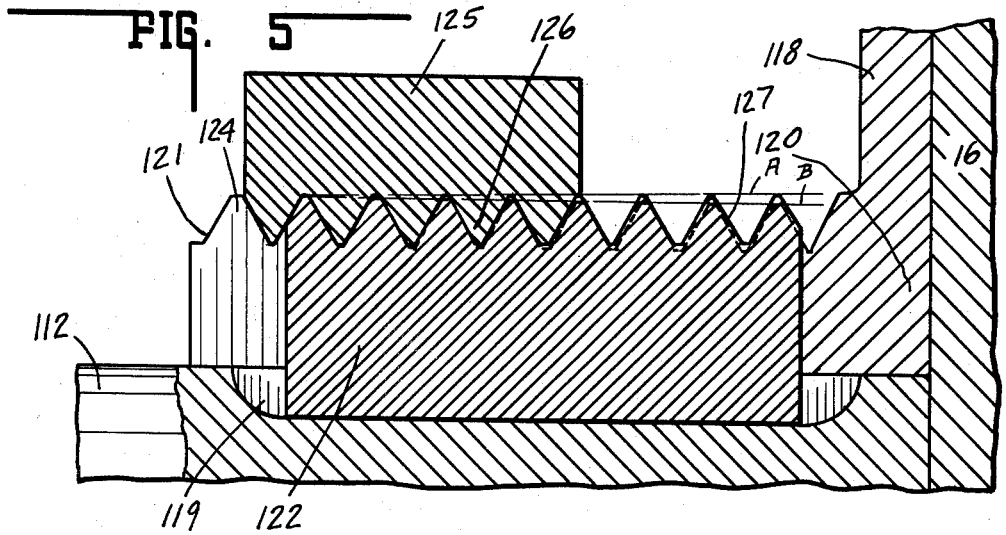
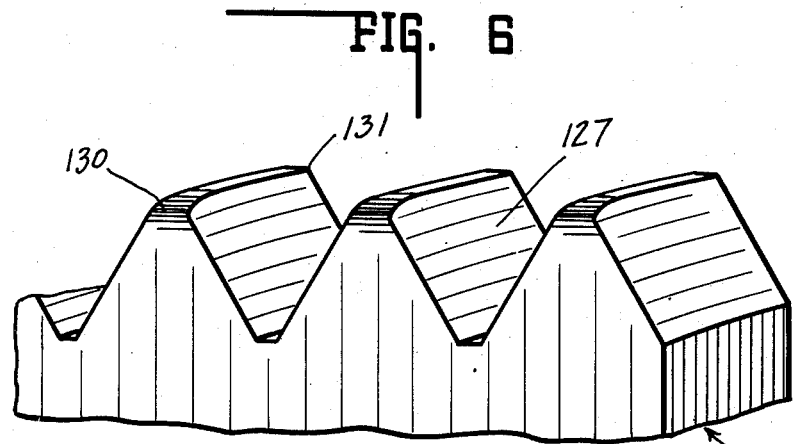
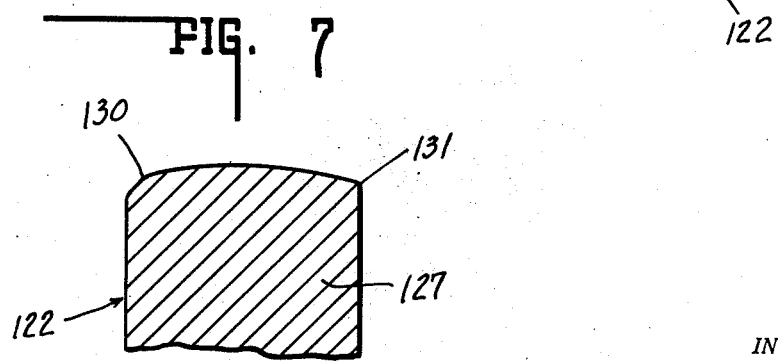
INVENTOR.
FREDRICK W. COFFING.
BY
*Lockwood, Hahn, Galt & Woodard,*
ATTORNEYS.

Patented May 18, 1954

2,678,840

UNITED STATES PATENT OFFICE 2,678,840

SHAFT COUPLING

Fredrick W. Coffing, Danville, Ill., assignor to Coffing Hoist Company, Danville, Ill., a corporation Application February 20, 1952, Serial No. 272,603

6 Claims. (Cl. 287—52.05)

This invention relates to a shaft coupling, more particularly of a character to provide a torque transmitting connection between reversible power shafts, this application being a continuation in part of my application, Serial No. 95,310 filed May 25, 1949, entitled Non-Slip Reversible Drive Connection, now abandoned.

It is the object of this invention to provide a connection of a threaded lock character wherein rotation in the normal direction tends to tighten the threaded lock, and when the connection is reversely rotated the locking association can not be loosened or disconnected, with the resulting loss of time and possible damage to other proximately positioned parts.

By way of example only, the invention may be incorporated in an engine driven propeller system wherein the propeller is disposed immediately forward of the rudder, in a shaft driving the propeller, being engine driven through a reversible transmission.

One feature of the invention resides in a connection, such as a reversible driving connection, which can not accidently become separated, and which connection comprises a locking nut associated with a threaded hub extension carried by a torque transmitting shaft, the hub and shaft having key connections through threaded keys engageable by the locking nut.

A further feature of the invention resides in the provision of longitudinally limited keyways or key seats in the key receiving shaft such as to embrace the keys mounted therein to limit or to lock them against axial movement relative to the shaft whereby the shaft can not be axially displaced relative to the hub extension until the locking nut is completely removed from its holding engagement with the threaded keys.

Another feature of the invention resides in the tapering relation of the threaded keys relative to the threaded hub extension and nut, in association with the provision of a beveled end on each of the key threads in a nut threading or advancing direction and a sharp end on each of the key threads in the trailing or nut removing direction. By means of this arrangement the nut becomes self-locking relative to the keys in that the beveled ends of the threads permit the nut to be screwed tight, whereas the sharpened ends of the keys dig into the metal of the nut and hold it against backing off. By reason of the relative tapering between the threads of the keys and the nut, the trailing threads will be sufficiently spaced to receive any sheared metal so that the nut may be backed off under proper force applied thereto without damage or mutilation of the threads.

In the drawings, Fig. 1 is a schematic elevation of a forward reversible power system embodying the invention.

Fig. 2 is a central sectional view of the non-slipping connection per se.

Fig. 3 is a perspective view of a two-piece locking key embodied in the invention.

Fig. 4 is a plan view of the locking key showing a serrated friction surface.

Fig. 5 is an enlarged and exaggerated sectional view through the locking key and nut illustrative of the tapered relation therebetween.

Fig. 6 is an enlarged and exaggerated perspective view of the advanced threads of the key, and Fig. 7 is a central vertical section taken through one of the threads of Fig. 6 showing the left hand top of a right hand thread.

In the drawings for purposes of illustrating one application of the invention I have shown an outline of a vessel having a rudder 10, a propeller 11 and a propeller shaft 12. The propeller shaft 12 is removably connected with the engine 13 which supplies the torque thereto through the usual transmission box 14 from which extends the power shaft 15 terminating in a coupling flange plate 16. Rigidly secured by bolts and nut 17 to the plate 16 there is a coupling flange plate 18 of the removable coupling 20, said coupling 20 having an axially extending hub 21 disposed oppositely to the shaft 15.

The propeller shaft 12 is adapted to be received in the bore of the hub 21 with its end abutting the coupling plate 16, and is provided with opposed axially extending keyways 19. Each of said keyways terminates short of the end of the shaft, their respective lengths conforming to the length of the keys to be received therein so that said keys will be restrained against axial displacement by the ends of the keyways, as shown in Fig. 2. The hub 21 is provided with axial slots positioned to register with the respective keyways 19, a periphery of the hub being provided with screw threads 24.

A nut or similar locking member 25 is internally threaded as at 26 to screw upon the hub 21 with their respective threads in closely mating relation. The key structures 22 may be radially inserted in the slots 19, each having outward extending threads 27 adapted to mate and register with corresponding threads 24 of the hub, whereby the threads of the hub and key structures will jointly receive the threads of the nut or locking member 25. Upon the shaft 12 being inserted in the hub with its keyways 19 registering with the slots provided in the hub, the key structures may be seated therein and restrained from axial displacement relative to the shaft by the ends of the keyways. With their respective threads registering, the nut 25 may be screwed up tight to thereby interlock the hub and the shaft with the key structures.

Since the keyways 19 are not cut to the end of the shaft and are substantially the length of the key structures, the latter cannot slip or shift axially off the shaft. Consequently, upon normal rotation the structure locks up, and upon reverse rotation the locked keys will prevent slippage of the shaft relative thereto due to the restricted length of the keyways. For increasing the interlocking engagement between the locking member and the keys, the key structures 22 are slightly tapered as best shown in Figs. 3 and 5 which tends to provide a wedging effect between the inner surfaces of the keys and the engaged surfaces of the keyways. For increasing the wedging grip resulting from the tapering of the keys their underfaces 28 may be provided with serrations or roughening threads or knurling as indicated at 29. Thus, when the nut has been tightened over the tapered keys, the key structures will have frictionally engaged the root surfaces of the keyways; and since the keys are slightly tapered, the nut pressure will be predominantly radially inward through the keys to the shaft and through the non-slip serrated surface 29 resulting in a rigid interlocking therebetween.

The width of the slots in the hub and the registering keyways 19 are substantially the same. To provide an angular locking force, if desired, the key structure may be parted diagonally as shown at 30 in Fig. 3. Such parting is preferably arranged so that when the shaft 12 is normally rotated. The trailing face of the hub slot will engage face 31 of the threaded segment 32 of the key structure. The advancing face 33 of segment 34 forming the base of the key structure then engages the advance face of the keyway 19 of the shaft. When the nut is threaded to the pitch of the key structures, the diagonal faces 30 are in contact with each other, and the opposite faces 31 and 33 are in contact with the faces of the side walls of the keyways, the structure of the key will wedge the side walls 31 and 33 tightly against the side walls of the keyways. Furthermore, due to the fact that the bottom face 28 is roughened, longitudinal movement of the keyway structure is prevented to more fully insure the wedging action. Since the parting 30 is of diagonal type and the faces of the segments are wedged against the walls of the keyways with the roughened surface engaging the bottom thereof, neither of the key structures can be displaced axially to any appreciable extent, even if some slight release occurs incident to sudden reversal of the shaft. This is especially so because of the roughened portion 29. By reason of the above structure, accidental disconnection of the shaft 12 from the coupling upon a sudden reverse drive being imparted thereon is prevented.

For causing the nut 125 or like locking member to be of a self-locking character, the general plane of the thread portions 127 of the key structure 122 may be formed in tapering relation to the threads 124 of the hub as illustrated in Fig. 5. Thus Fig. 5 is illustrative of a modification of the invention as above described wherein there is provided a coupling flange 118 adapted to be secured to the coupling flange 16 of the shaft 15. The coupling 120, of which said flange is a part, is provided with an axially extending hub 121 carrying the peripheral threads 124 adapted to receive the threads 126 of the nut 125, all as above described and shown in Fig. 2. The shaft 112 to be coupled is formed with the opposed keyways 119 for receiving the key structures 122.

As illustrated in Fig. 5 in a somewhat exaggerated manner over Fig. 2, the key structure is tapered as above mentioned in connection with the structures 22 so that the plane of the thread portions of each key structure 122 incline slightly above the threads 124 of the hub from the near thread portions, which mate therewith, to the far thread portions as indicated by the lines A—B. Since the threads 126 of the nut 125 are such as to thread upon and mate with threads 124 of the sleeve, they will also engage and mate with the near thread portion of the key structure. But as the nut is advanced over the far raised thread portions of the keys, they will be forced radially inwardly on their key seats under progressively greater pressure until the advance of the nut is finally arrested by such wedging action.

As shown in Fig. 5 the divergence between the thread portions of the key structure on the one hand, and the threads of the hub on the other hand, are indicated by the lines A—B, respectively. The purpose of such a tapered arrangement and allowance of the degree of offset between the key and the hub threads is not only to increase the wedging action of the keys, but also to accommodate them to the following described self-locking structure.

As shown in Figs. 6 and 7 the advance ends of the thread portions 127 are rounded or beveled as indicated at 130 for a right hand thread, while remaining relatively sharp at their trailing ends, as indicated at 131.

By reason of this arrangement the nut 125 may be readily advanced over the beveled ends 130 of the key thread portions to its locked up position, but any action to back off the nut in the reverse direction will advance or turn it against the relatively sharp corners 131 of the key thread portions 127. Due to the tight lockup of the nut, and the relatively sharp character of the ends 131, they will grip or gouge into the metal of the nut threads to resist any backing off movement. However, the nut may be forcibly unscrewed over such resistance resulting in a shearing off of some of the metal from the inside of the nut, which will thereupon find its way into the slight space or degree of clearance.

The tapered relation between the threads of the keys and hub will provide such clearance for reception of sheared metal when the nut is forcibly removed as not to so mutilate the threads as to prevent or resist re-threading of the nut over the keys. But when the nut is removed and replaced it may be necessary to thread the nut over the keys to a more advanced position, whereupon it will again be of a self-locking character.

In connection with the beveled and relatively sharp ends 130, 131, it may be noted that in a right hand thread the left side of the key thread portions are beveled or rounded to permit smooth threading of the nut into tightened position; and for a left hand thread the reverse relation of the threaded ends 130, 131 would be provided.

The invention claimed is:

1. A coupling for two axially aligned shafts terminating adjacent each other and adapted for reversible rotation, including a longitudinally bored externally threaded hub member secured to one of said shafts and into which the end of the other shaft extends, said hub member being slotted longitudinally thereof, a keyway of predetermined length in said other shaft end terminating short of the end thereof aligned with the slot in said extension, a key having a length conforming to the length of said keyway mounted in the latter and extending into the slot of said extension and having a series of thread portions exposed through said slot with at least one of said thread portions in alignment with a thread portion of said extension, and a locking member internally threaded and screwed onto said threaded extension and the aligned thread portion of said key, the thread portions of said key being longitudinally tapered relative to said threaded extension to effect a wedging and self-locking engagement between said nut and key.

2. A coupling for two axially aligned shafts terminating adjacent each other and adapted for reversible rotation, comprising a longitudinally bored externally threaded hub extending axially of the end of one of said shafts to receive the end of the other said shaft, said hub being longitudinally slotted, said other shaft having a keyway of predetermined length terminating short of the end thereof positioned in alignment with said slot, a key of substantially the length of said keyway mounted therein and extending into said slot; a series of thread portions on the exposed surface of said key of the same pitch as the threads of the hub and in threading alignment therewith, the series of thread portions of said key being arranged with a slight taper relative to the thread portions of said hub with an intermediate thread portion aligning with intermediate threads of the hub, and a locking member internally threaded and screwed onto said hub into wedging and self-locking engagement with the thread portions of said key extending slightly above the corresponding threads of said hub.

3. A coupling for two axially aligned shafts terminating adjacent each other and adapted for reversible rotation, comprising an externally threaded hub extending axially of the end of one of said shafts having an axial socket for receiving the end of the other said shaft, said hub being longitudinally slotted, said other shaft having a keyway of predetermined length terminating short of the end thereof positioned in alignment with the slot of said hub, a key of slightly less length than said keyway positioned therein to extend through said slot and having slot exposed exterior thread portions, the thread portions substantially conforming to the hub threads, said key structure having a tapering depth, the far thread portions of said key structure at the end thereof having the greatest depth being closest to the end of said other shaft, and a locking member threaded upon said structure and hub threads to wedge said key into said keyway and be frictionally self-locking with said far thread portions.

4. A self-locking coupling comprising an externally threaded sleeve and a shaft having one end axially received therein the said sleeve threads being interrupted by a longitudinal slot, said shaft end having a longitudinal keyway formed therein and of the same width as said slot and in registry therewith, a key of substantially the length of said keyway engaged therein and extended into said slot and having a series of thread portions generally registering with the threads of said sleeve, the thread portions of said key being generally tapered longitudinally relative to the threads of said sleeve with the far thread portions slightly spaced above the threads of said sleeve with the near and intermediate thread portions of said key and sleeve in alignment, the advance ends of the thread portions of said key being beveled and the trailing ends thereof relatively sharp, and an internally threaded locking member having its ends engaged with the threads of said sleeve and key in a direction to advance over the beveled ends of the thread portions and wedging said key into frictional engagement with said keyway and in interlocking relation with the sharp trailing ends of its thread portions.

5. A coupling including an externally threaded sleeve adapted to be coupled to a shaft axially projected therein, said sleeve having a key receiving elongated slot therein; a corresponding key seating groove in said shaft registerable therewith, a key seated in said groove and of substantially the same length as said groove, said groove terminating short of the end of said shaft, said sleeve having external screw threads interrupted by said slot, and extending through said slot and having an exposed threaded face adjacent the sleeve threads, said key being seated with its threaded face in generally tapering relation with the threads of the sleeve, the threaded face of the key being beveled at the advance ends of its thread portions and relatively sharp at their trailing ends, and an internally threaded locking member threaded over said sleeve with its threads in engagement with the sleeve and key threads in a direction to advance over said beveled ends into key wedging position to be engaged and locked against backing off by said relatively sharp ends of the key thread portions.

6. A self-locking coupling comprising a threaded sleeve and a shaft axially received therein, said sleeve being externally threaded with the threads thereof interrupted by a longitudinal slot, a keyway formed in said shaft of the same width as said slot for registry therewith, a key extended into said slot and having a series of thread portions generally registering with the threads of said sleeve, the advance ends of the thread portions of said key being beveled and the trailing ends thereof relatively sharp, and an internally threaded locking member having its threads engaged with the threads of said sleeve in a direction to advance over the beveled ends of the thread portions to wedge said key into frictional engagement with said keyway and engaged in interlocking relation with the sharp trailing ends of its thread portions.

References Cited in the file of this patent

UNITED STATES PATENTS

| Number | Name | Date |
| --- | --- | --- |
| 1,088,892 | Foreman | Mar. 3, 1914 |
| 2,401,536 | Williams | June 4, 1946 |